United States Patent [19]
Gettinger

[11] 3,846,637
[45] Nov. 5, 1974

[54] APPARATUS FOR ELIMINATING NOXIOUS GASES FROM THE EXHAUST OF AN INTERNAL COMBUSTION ENGINE

[76] Inventor: Joseph Gettinger, 2115 W. Chare Ave., Chicago, Ill. 60645

[22] Filed: Sept. 10, 1973

[21] Appl. No.: 395,404

Related U.S. Application Data

[63] Continuation-in-part of Ser. No. 96,859, Dec. 10, 1970, abandoned.

[52] U.S. Cl. .................. 250/546, 60/275, 60/303, 204/164, 250/542
[51] Int. Cl. ......................... F01n 3/00, B01j 1/14
[58] Field of Search ............ 250/542, 546; 204/164, 204/DIG. 6, 165; 60/275, 303

[56] References Cited
UNITED STATES PATENTS

| | | | |
|---|---|---|---|
| 2,468,177 | 4/1949 | Cotton | 204/164 |
| 2,771,736 | 11/1956 | McKinley | 60/303 X |
| 3,157,479 | 11/1964 | Boles | 60/275 |
| 3,285,709 | 11/1966 | Eannario et al. | 60/275 |

FOREIGN PATENTS OR APPLICATIONS

| | | | |
|---|---|---|---|
| 411,807 | 9/1932 | Great Britain | 250/542 |
| 832,946 | 4/1960 | Great Britain | 250/542 |
| 1,140,424 | 7/1957 | France | 60/275 |

*Primary Examiner*—F. C. Edmundson
*Attorney, Agent, or Firm*—Brezina & Lund

[57] ABSTRACT

Noxious gases such as carbon monoxide, nitrous oxides and the like are eliminated from the exhaust gases from an internal combustion engine by means of a reactive process caused by multi-oscillating free electrons of extreme high tension in intermittent sequences and ultra high frequency of oscillations with a described juncture of the exhaust conduit of an internal combustion engine. The ultra-extreme motion of the free electrons effects a reactive process of rupturing the molecular bond of the noxious gases, whereupon the elementary components of such disassociate, however, to combine instantaneously into complex molecular combinations of non-toxic nature. A gap is formed between a first electrode of a solid form, constituting an anode and a ground and a second electrode in the form of a multi-conductor arrangement, constituting cathodes. A gas filled tube having a single electrode at one end and multiple electrodes at the other end constituting the multi cathodes. The gaseous element effects a simultaneous multi-inductance within the multi-conductor electrodes constituting the cathode arrangement.

The single electrode of the gas tube is connected to the secondary of a step-up transformer having a primary connected through a thermionic gas tube or some other suitable rectifier to an AC supply. A first electrode of solid form constituting an anode and ground. A second electrode in the form of a multi-conductor arrangement constituting cathodes coupled to the secondary of a transformer having a primary connected through a thermionic gas tube rectifier to an AC supply. A gas filled tube acts as a simultaneous multi-induction device for the multi-conductor cathodes. Preferably, air under pressure is supplied into the exhaust conduit on the downstream side, at a preceding juncture to the aforesaid juncture of the high tension multi-oscillating free electrons. At this point of the disclosure the inventor wishes to promulgate and postulate a new concept in atomic theory relating to the behavior of the component valence electrons of an atom: The postulate is: When multiple atoms combine into a molecule all valence electrons of such move instantaneously into peripheral position of the combine and such effects the molecular bond. The very import of this postulate should enhance the comprehension of this invention.

4 Claims, 4 Drawing Figures

PATENTED NOV 5 1974

3,846,637

= ONE SEQUENCE

APPARATUS FOR ELIMINATING NOXIOUS GASES FROM THE EXHAUST OF AN INTERNAL COMBUSTION ENGINE

This application is a continuation-in-part to my application, Ser. No. 96,859, filed Dec. 10, 1970, now abandoned.

The present invention relates to a novel device to convert noxious gaseous monoxide molecules into nontoxic complex molecular combines at a described specific juncture of the exhaust conduit of an internal combustion engine.

Noxious gases, such as carbon monoxide, nitrous oxides and the like are eliminated from the exhaust gases from an internal combustion engine by converting such into nontoxic complex molecules. By herewith described means which effect a reactive process caused by high tension multi-oscillating streams of free electrons of intermittent sequences and ultra high frequencies within a described interchangeable part of the exhaust conduit of an internal combustion engine, the ultra-extreme motion of the oscillating free electrons effect a reactive process of rupturing the molecular bond by expelling the valence electrons from the noxious gas molecules resulting in the the instantaneous disassociation of the elementary components of the noxious gases. At such instant the now free oxygen atoms combine instantaneously into plural combines of oxygen atoms through their inherent greater dipolar effect of attraction to each other. Moreover, the plural combine of the oxygen atoms increases the polar effect of attraction effecting other free elementary atoms being drawn into a molecular combine of diverse complex result and such completes the conversion process.

The arrangement of the essential means contributing to effect aforesaid reactive process is described as follows: within the exhaust conduit of an internal combustion engine an interchangeable part of a ceramic conduit is connected therewith. This interchangeable part consists of a square elongated ceramic block having a square duct embodied therethrough and said duct is connected at each end to the exhaust conduit by a circular metallic sleeve which is encased in the ceramic block as shown by accompanying drawing. Moreover, there are also two square ducts which join the aforesaid duct at midpoint in a left and right sideward opposite position, said left and rights ducts contain the two essential electronic terminals, an anode and a multi-conductor cathode terminal, which when activated produce the reactive process of molecular conversion. The components comprising these two terminals are individually and rigidly encased within a ceramic mixture of extremely high heat resistance and of extremely high insulating property within the two square-shaped blocks fitting precisely in to the aforesaid opposite left and right ducts where one square end surface of each block completes the left and right wall surfaces of the interchangeable elongated square exhaust duct at aforesaid midpoint. Through such particular fitting the opposite anode and cathode terminals are separated by the width of the exhaust duct which constitutes the prerequisite gap to free electron oscillation. The components of the anode and multi-conductor cathode terminals consist of the following enumerated parts by accompanying drawing: The anode terminal is of a square base pyramidal shape and as such is constituted of two parts: a base plate made of aluminum and nickel alloy, such base plate constitutes the left midpoint ductwall surface; outwardly adjacent and joined to such is the pyramidal shape consisting of copper and such is connected at its zenith to an electric ground conduct, the opposite multi-cathode arrangement consists of the following enumerated parts; a plural number of electric conductors are individually and rigidly encased within afore described ceramic material. Each conductor consists of two parts, namely; a longer part is a copper wire such is jacket welded to a one-half of an inch length of tungsten wire. The jacketweld consists of dielectric substance. Furthermore, the exposed tungsten wire ends are flush with the surface of aforesaid ceramic block, which comprises a part of the right wall duct surface at midpoint of such; the opposite ends of the copper wires are also flush with the opposite end surface of said ceramic block and such are coated with a silicone substance; these conducting wires are encased in staggered formation to each other within a two-linear arrangement to allow a greater separation of the conductors for insulation purpose and to have a minimum prerequisite number of 15 conductors occupying one inch of the width of the cathode terminal. The specific numbers are required for the total subjection of the exhaust gases into the reactive process of the molecular bond disruption. Moreover, this aforesaid ceramic block, with its multicathode components is a part component of a novel electronic induction device, which by its specific arrangement of its components effects the simultaneous multi-stream oscillation of free electrons within the gap of the anode and cathode terminals. A cylindric glass tube is fused onto said block, the opposite end of said glass tube is in the shape of a narrow elongated cylindric neck. Such contains the high tension electronic terminal, which consists of a small, short cylindric metal tubing with a metallic bottom. Such is connected to a copper wire which is connected to the secondary induction coil of a step-up-transformer. Aforesaid cylindric glass tube is hermetically sealed at both ends and is filled with a gaseous element. Such gaseous element is the principal and essential factor of effecting a simultaneous multipoint induction, such can be analyzed in the following terms: The immersed high voltage terminal into the gaseous element within the neck of aforesaid glass tube emits interrupted high voltage tension pulses in high frequencies. Through the impact of the high voltage tension on the gaseous molecules, the components of the gaseous element, in particular the electrons are forced into extreme high motion of speed. Such increased motion of the electrons generate a higher voltage tension throughout the gaseous element within the glass tube, thereby effecting the simultaneous multi-point inductance of extreme high voltage tension within the adjacent multi-electrodes (which comprise the multi-cathode terminals) and the opposite anode terminal through its proximity range of anodic potential. Such effects the emittance of free electrons from the cathode terminals to be attracted to the anode plate thus completing the inductance. However, the extreme impact and the multitutde of the free electrons onto the anode plate reverses the polarity of the anode and the reversal of such effects the extreme oscillating motion of the free electrons — such to effect the rupture of the molecular bond of the interposed residual gaseous molecules.

Furthermore, the residual gaseous molecules are preferably forcefully mixed with atmospheric molecules at a preceding or upstream point within the exhaust path, through injection of compressed atmosphere of not less than 30 lbs of atmospheric pressure such a condition is basically to lower the thermal temperature of the residual exhaust components. Such lower temperature enhances the capability and durability of the anode and multicathode terminals.

This invention contemplates other objects, features and advantages, which will become more fully apparent from the following detailed description taken in conjunction with the accompanying drawings which illustrate preferred embodiments and in which:

FIG. 1 diagrammatically illustrates apparatus constructed according to the invention and applied to an internal combustion engine for eliminating noxious gases from the exhaust system thereof;

Figure 1:
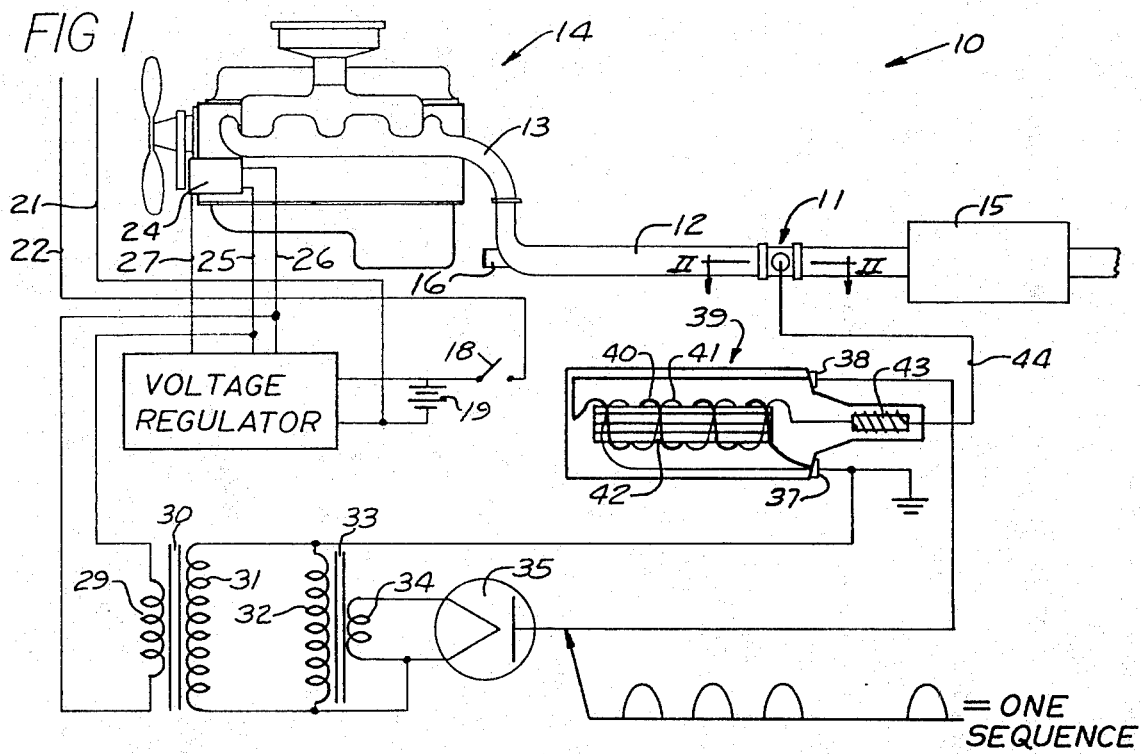

Referring to FIG. 1, reference numeral 10 generally designates an internal combustion engine arrangement incorporating noxious gas eliminating apparatus constructed in accordance with the principles of this invention. In general, the apparatus comprises a removal unit 11 which is installed in an exhaust pipe 12 between the exhaust manifold 13 of an internal combustion engine 14 and a conventional muffler 15. Preferably, air under pressure is injected into the exhaust conduit 12 through a fitting 16 between the manifold 13 and the unit 11. An air compressor, not shown, is coupled to the fitting 16 and is electrically energized through a switch 18 which may be the ignition switch, the compressor and the ignition system, (also not shown) being connected to conductors 21 and 22 to be energized when the switch 18 is closed. Battery 19 is also connected to a voltage regulator 23 connected to an alternator 24 through lines 25, 26 and 27. Rectifier means may be included in the voltage regulator 23 to convert the AC voltage output of the alternator 24, developed between lines 25 and 26, into a DC voltage for charging the battery 19.

The alternator output voltage, between lines 25 and 26, is applied to the primary winding 29 of the step-up transformer 30 having a secondary winding 31. By way of example, and not by way of limitation, the voltage developed across the secondary winding 31 may be on the order of 110 volts. The secondary winding 31 is connected to the primary winding 32 of a transformer 33 having a secondary winding 34 connected to the filament of a thermionic gas tube 35, one end of the second winding 34 being connected to one end of the secondary winding 31. The other end of the secondary winding 31 and the anode of the gas tube 35 are connected to terminals 37 and 38 of a step-up transformer unit 39. The unit 39 includes a primary winding 40 and a secondary winding 41 on an iron core 42, as diagrammatically illustrated, the primary winding 40 being connected between terminals 37 and 38 and one end of the secondary winding 41 being also connected to the terminal 37. The opposite end of the secondary winding 41 is wound on a heavy conductor 43, forming a terminal of the unit, and a conductor 44 extends from the terminal 43 to the unit 11. The secondary winding 41 has a very large number of turns and there is a very high ratio between the number of secondary winding turns and the number of primary winding turns. Although not shown, it will be understood that the transformer unit 39 may be disposed in a suitable casing, filled with a potting compound for insulation of the windings.

Figure 2:
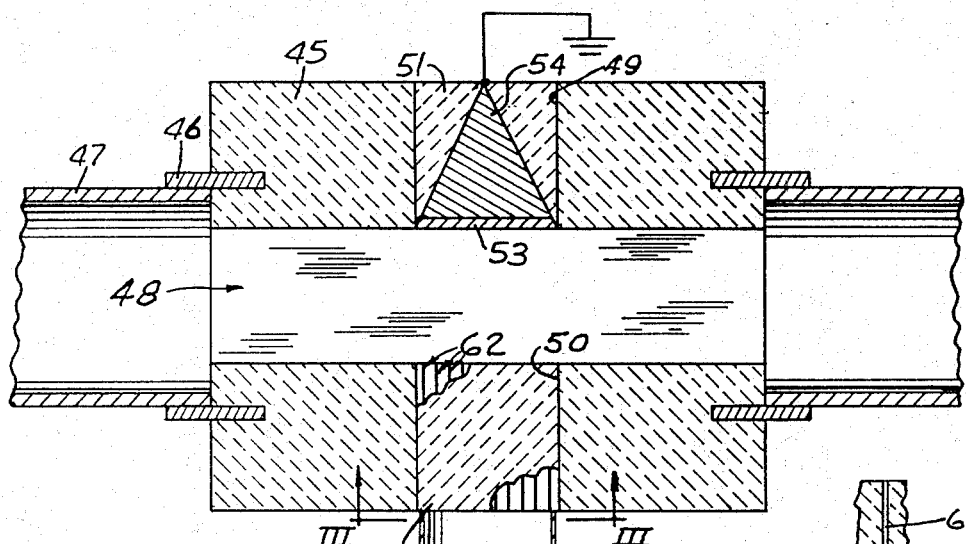
FIG. 2 is a cross-sectional horizontal view of the ceramic interchangeable part of the exhaust conduit, taken substantially line II—II of FIG. 1.

Referring to FIG. 2, the device 11 comprises a square elongated ceramic block 45 which is inserted into the exhaust conduit 12 by suitable fittings 46 and 47. Said block has a centric elongated square duct 48 and two opposite square ducts 49 and 50 embodied within. Said opposite square ducts 49 and 50 join the elongated square duct 48 at midpoint of such and said opposite ducts 49 and 50 have the same dimensions as the centric elongated duct 48. Said opposing ducts 49 and 50 contain in precise fitting two square ceramic blocks 51 and 52. The inner surfaces of said two blocks comprise in part the left and right wall duct at midpoint within the embodied elongated centric duct. Ceramic block 51 contains an incased metal electrode element of a square base pyramidal shape consisting of two parts 53 and 54. Square base part 53 is an aluminum-nickel alloy joined onto a pyramidal copper shape 54 aforesaid pyramidal copper shape 54 aforesaid pyramidal shape constitutes the anode terminal; the opposite ceramic block 52 contains multiple metallic electrodes 55 such as are individually and rigidly incased therein and such comprise the multicathode terminal 56. The opposite ends of said multi-electrodes are coated with a silicone substance, a cylindric glass tube 57 having an elongated reduced neck 58 is fused onto block 52. The end of said neck 58 is sealed with a glass stopper 59 which contains a conductor wire which is connected to a short metallic cylinder 60 and such constitutes the high tension terminal. The cylindric glass tube 56 is filled with a gaseous element 64.

Figure 3:
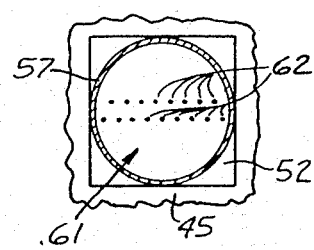
FIG. 3 is a sectional view of the removable ceramic block 52 containing the encased multi-electrodes and the end part of the inserted glass tube therein.

FIG. 3 depicts the outward opposite surface of the ceramic block 52, showing a staggered arrangement 61 of electrodes 62 which comprises the multi-cathode arrangement. The end of the circular cylindric glass tube 56 is incased and fused onto the end surface of the block 52.

Figure 4:
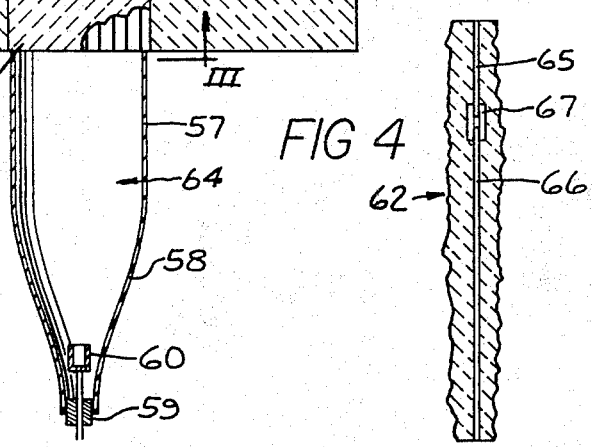
FIG. 4 is a sectional view of the removable ceramic block 52 showing the composition of a single electrode within said block.

FIG. 4 depicts the composition of one of incased electrodes 62 within the incased multi-electrodes arrangement within ceramic block 52. The composition of said electrodes consist of a 0.5 inch length of tungsten wire 65, the remainder being a length of copper wire 66. Said two wires 65 and 66 are joined together by a surrounding jacketweld of a dielectric substance 67.

Although specific embodiments of the invention have been illustrated and described, it will be understood that various alterations in the details of construction may be made without departing from the scope of the invention, as indicated by the appended claims.

I claim as my invention:

1. In an arrangement for use in decomposing exhaust gas in an internal combustion engine exhaust system including an exhaust conduit and a muffler, a detachable conduit section for disposition in said exhaust conduit ahead of said muffler, two oscillatory terminals in said detachable conduit section, one of said terminals being an anode terminal and the other being a multi-electrode cathode terminal with there being a face-to-face separation between said anode terminal and said cathode terminal of at least ½ inch, said anode terminal comprising a square base pyramidal shape consisting of two parts and joined together; one of said two part being square base plate of not less than one-eighth of an inch in thickness of aluminum-nickel alloy and the other of said two parts being pyramidal shape of copper, a copper wire connected at the zenith of said shape and serving as a ground connection, a square block of ceramic material, said pyramidal shape of copper being rigidly incased within said square block of ceramic material, said base plate constituting the anode surface, said multi-electrode terminal comprising a square block of high heat resistance and high electrically insulating material and at least fifteen electrode wires individually and rigidly incased in staggered linear formation in said material within the width of one inch of said block, said block having a square inner end surface containing the inner ends of said electrode wires in spaced face to face relationship to said square inner surface of said anode terminal and defining therewith a gap for passage of residual exhaust gases therethrough and for formation of multi-oscillatory streams of free electrons therewithin, said block of said multi-electrode having an outer end of square shape with the outer ends of said electrode wires being arranged in a two linear staggered formation and said outer ends of said electrodes are flush with the ceramic material and are coated with a silicone substance.

2. In an arrangement as defined in claim 1, an induction device comprising a hollow generally cylindric shell of glass having an elongated neck end portion and having an opposite end incased and fused onto the outer square surface of said ceramic block of said multi-electrode terminal the ends of said electrodes being flush with the ceramic surface of said block and being coated with a silicone substance, a glass stopper sealing said neck portion, an electrode element in the form of a short metallic cylinder having a metallic bottom end, a copper wire conductor connected to said bottom end extending through said glass stopper, a high voltage transformer connected to said copper wire and supplying interrupted sequences of high voltage current thereto, said cylindric induction device containing a gaseous element which is relatively instantaneously reactive to high frequencies of interrupted sequences of high voltage current to activate and effect a simultaneous multi-inductance within the adjoining multi-electrodes cathode and the opposite anode to effect multi-streams of oscillating free electrons across the gap between said multi-electrodes cathode terminal and said anode terminal.

3. In an arrangement as defined in claim 1, high voltage supply means comprising a step-up transformer having primary and secondary windings, a thermionic gas tube rectifier connecting said primary winding to an AC supply for developing in said secondary winding high voltage current in interrupted sequences of high frequencies, and means for coupling said secondary winding to said two oscillatory terminals.

4. In an arrangement as defined in claim 1, said detachable conduit section including an elongated ceramic block of square cross-sectional configuration and having a longitudinally extending square duct for passage of exhaust gases longitudinally therethrough, a pair of transverse ducts of square cross-section opposite each other in aligned relation and joining said longitudinally extending square duct at the mid point of said longitudinally extending square duct, said square block of said anode terminal being precisely fitted in one of said transverse ducts and said square duct of said multi-electrode terminal being precisely fitted in the other of said transverse ducts.

* * * * *